(12) United States Patent
Deppe et al.

(10) Patent No.: US 7,954,961 B2
(45) Date of Patent: Jun. 7, 2011

(54) METHOD FOR DRIVING A HIGH-PRESSURE GAS DISCHARGE LAMP OF A PROJECTOR SYSTEM

(75) Inventors: Carsten Deppe, Aachen (DE); Holger Moench, Vaals (NL); Tom Munters, Turnhout (BE); Christofher Daniel Charles Hooijer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 645 days.

(21) Appl. No.: 11/993,338

(22) PCT Filed: Jun. 26, 2006

(86) PCT No.: PCT/IB2006/052093
§ 371 (c)(1),
(2), (4) Date: Dec. 20, 2007

(87) PCT Pub. No.: WO2007/004114
PCT Pub. Date: Jan. 11, 2007

(65) Prior Publication Data
US 2010/0141906 A1 Jun. 10, 2010

(30) Foreign Application Priority Data
Jun. 30, 2005 (EP) .................... 05105898

(51) Int. Cl.
*G03B 21/20* (2006.01)
*G03B 21/14* (2006.01)
*G09G 3/18* (2006.01)

(52) U.S. Cl. ............... 353/85; 353/84; 345/53

(58) Field of Classification Search ............ 353/85, 353/84, 121; 315/291; 345/53; 232/227, 232/291
See application file for complete search history.

(56) References Cited

U.S. PATENT DOCUMENTS

| 5,070,276 A | 12/1991 | Burgholte et al. |
| 5,371,443 A | 12/1994 | Sun et al. |
| 5,396,152 A | 3/1995 | Bonigk |
| 5,452,024 A | 9/1995 | Sampsell |
| 5,544,831 A | 8/1996 | Van Netta |
| 5,706,061 A | 1/1998 | Marshall et al. |
| 6,504,323 B2 | 1/2003 | Yuda et al. |
| 6,567,134 B1 * | 5/2003 | Morgan ............ 348/743 |
| 2002/0036615 A1 | 3/2002 | Karamoto |
| 2005/0151482 A1 * | 7/2005 | Riederer et al. .......... 315/291 |

FOREIGN PATENT DOCUMENTS

| DE | 10220509 A1 | 11/2003 |
| JP | 2003243195 A | 8/2003 |
| WO | 9511572 A1 | 4/1995 |
| WO | 03096760 A1 | 11/2003 |
| WO | 2005120138 A1 | 12/2005 |

* cited by examiner

*Primary Examiner* — William C. Dowling
*Assistant Examiner* — Ryan Howard

(57) ABSTRACT

A method for driving a high-pressure gas discharge lamp of a projector system, which is suitable to produce and to supply to a light valve device during a projection interval (4) a light beam of a basic color which is selected from several basic colors (G, R, B). The lamp is driven by a lamp current. During said projection interval light valves of the light valve device are controlled in a pulse width modulation manner to have each valve provide a respective wanted light integral over said projection interval. During at least one of a number of successive projection intervals associated with one basic color a magnitude of the lamp current is temporarily reduced for at least a time that all light valves can be controlled for said one basic color.

16 Claims, 3 Drawing Sheets

METHOD FOR DRIVING A HIGH-PRESSURE GAS DISCHARGE LAMP OF A PROJECTOR SYSTEM

FIELD OF THE INVENTION

The invention relates to a method for driving a high-pressure gas discharge (HID) lamp of a projector system as described in the preamble of claim 1.

BACKGROUND OF THE INVENTION

Although no document can be referred to, a method of the above type is disclosed by Texas Instruments, U.S.A. With the prior method a white light beam of the projector system is fed through a filter wheel, which comprises along a circular path a row of basic filter segments (or sectors) of basic colors. After passing the filter wheel the light beam is fed to a light valve device, in particular a micro mirror device. The light valve device has a matrix of minute light valves, such as micro mirrors as disclosed by U.S. Pat. No. 5,452,024, which can be controlled individually in a pulse width manner to direct the light beam or not to an optical part and then to a projection screen. During the passage of each basic filter segment by the light beam all of the light valves are controlled this way. One basic filter segment of a basic color, in particular green, of the row of basic filter segments has a reduced circumferential length. The space thus obtained is occupied by an auxiliary filter segment of the same color but having a smaller transmission factor. The light valves will receive less light from the auxiliary filter segment. As a result, with light control properties, such as the minimal switching time for said individual pulse width modulation of valves, being unchanged, a display resolution (as a number of bits grayscale per color per pixel) for said color is increased. Said auxiliary filter segment is known as grey filter. This method is known as DVE (Dark Video Enhancement).

A disadvantage of the prior art method is that the use of the auxiliary filter segment increases costs for manufacturing of the filter wheel.

In addition, the light beam has a finite dimension, for example 5 mm diameter, when passing through the filter wheel. As a result, during a transition from one filter segment to a next filter segment of a different color and/or transmission factor the light received by the light valve device is of composite color, undetermined or fuzzy. Such a transition is called a spoke. A spoke has a significant circumferential dimension, for example 11.5°. The auxiliary filter segment introduces an additional spoke, which reduces the useful part of the light integral and therefore the brightness for the segment having the additional spoke or of all segments if the reduction is distributed amongst them. A controller must take such reduction into account when modulating the light valves during projecting of the beam through the segment having the additional fuzzy spoke.

In addition, because of a reduced transmission factor of the auxiliary filter segment energy is wasted. The energy waste during the passage of the auxiliary filter segment may amount to 75%.

OBJECT OF THE INVENTION

It is an object of the invention to solve the drawbacks of the prior art as described above.

SUMMARY OF THE INVENTION

The above object of the invention is achieved by providing a method as described in claim 1. Temporarily decreasing the lamp current can be carried out electronically. The transitions from a basic current magnitude to a minimum magnitude and back can be made fast. As a result the width and timing of said minimum magnitude and, accordingly, of the light passed to the light valves can be made more accurate. Because no physical modification of the filter wheel to provide it with an auxiliary filter segment is required, costs for manufacturing a projector system in which the method according to the invention is applied will be reduced. Because there is no filter segment with reduced transmission factor no energy is wasted.

DE 10220509 discloses a method for driving a high-pressure gas discharge lamp of a projector system by an alternating current having a basically rectangular waveform. Prior to changing the polarity of the lamp current, during a projection interval for a particular color, a current pulse is superimposed on the basic lamp current, such that the absolute value of the current is temporarily increased. The current pulse increases the temperature of the electrodes of the lamp. This will stabilize an arc between said electrodes during commutation, so that flickering is prevented. The current pulse will increase the intensity of the light for the duration of the pulse. This will result in a higher light intensity during a first interval of picture generation than without applying the current pulse. To compensate for this, during a second projection interval for said particular color than the interval containing said first current pulse, a second or compensation current pulse having a polarity opposite to the polarity of the first pulse is superimposed on the lamp current.

With the method disclosed by DE 10220509 the first pulses of increased magnitude with respect to a basic magnitude of the lamp current can be called positive pulses. The second pulses with decreased magnitude with respect to the basic magnitude of the lamp current can be called negative pulses.

The method according to the invention can be applied for driving a lamp of a projector system by an AC current or by a DC current. Therefore, the method according to the invention is not concerned with positive pulses and neither with negative pulses for compensating positive pulses.

BRIEF DESCRIPTION OF THE DRAWINGS

The invention will become more gradually apparent from the following exemplary description in connection with the accompanying drawing. In the drawing.

DETAILED DESCRIPTION OF EXAMPLES

The method according to the invention is for use in a projector system (not shown) which comprises a high-pressure gas discharge (HID) lamp, means for producing several light beams of different colors and for supplying the beams to different associated light valve devices, or for producing a single light beam of different basic colors during adjacent time intervals and for supplying the single beam to a single light valve device. An example of a light valve device is a micro mirror device, such as those manufactured by Texas Instruments, U.S.A. and disclosed by U.S. Pat. No. 5,452,024. Such a light valve device comprises a large number of micro mirrors, which are arranged in a rectangular matrix and which can be controlled individually to reflect one of said beams into a waste direction or to a part of the system comprising a projection screen.

The description below is restricted to a projector system using a single beam, which is directed to a color wheel having along a circular path a row of filter segments (or sectors). Adjacent segments have different basic colors. The wheel is rotated. The time during which the light beam passes any particular filter segment can be called a projection interval. During each projection interval all light valves are controlled individually. If the light valves are micro mirrors, they are controlled in a pulse width manner to supply a wanted average light intensity or wanted light integral during said projection interval. Examples of such a projector system are disclosed by U.S. Pat. No. 5,544,831, U.S. Pat. No. 6,504,323 and WO 95/11572.

Figure 1:
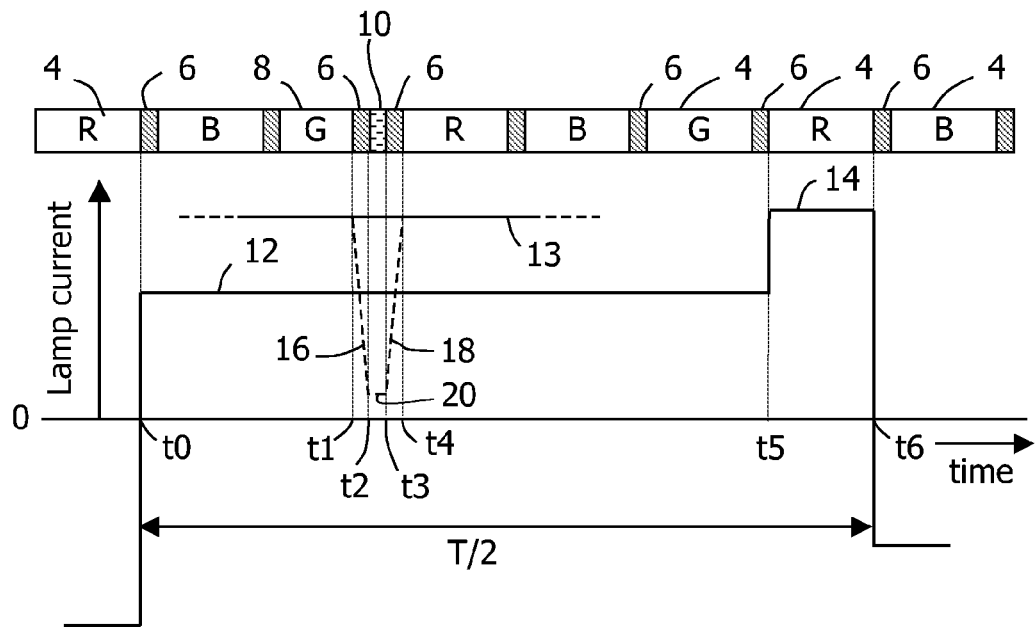
FIG. 1 shows a diagram of half a period of an AC lamp current synchronized with projection intervals corresponding to filter segments of different basic colors according to prior art.

FIG. 1 shows, between times t0 and t6, half a period of an alternating (AC) lamp current of the HID lamp of the projector system. The AC period is indicated as having a duration T. During each half of its period, the lamp current has basically a rectangular shape having a constant basic magnitude 12 between t0 and t5 and a raised magnitude 14 between t5 and t6. The raised magnitude from t5 to t6 is applied for stabilizing an arc between electrodes of the lamp to prevent flickering. Said raised magnitude has nothing to do with the invention and is illustrated for completeness only. In fact, the invention is not limited to the use of an AC lamp current, having such raised portion or not. The invention also applies for using a DC lamp current.

In the examples described below the filter wheel has a row of six filter segments for three different colors red (R), blue (B) and green (G). Each color is used twice. Adjacent segments have different colors. The projection intervals corresponding to the sequence of different colors of the light beam when directed through the rotating wheel are indicated by their color R, G, B and by reference numeral 4. The filter segments corresponding to those projection intervals are referred to in the description by numeral 4 as well. Transition portions, called spokes, of undetermined or fuzzy and/or reduced transmission factor between adjacent filter segments are indicated in the description by reference numeral 6. Their time interval is indicated by reference numeral 6 in the drawings as well. The rotation of the wheel and the lamp current are synchronized as indicated by vertical dashed lines at t0 and t6, such that commutation of the lamp current takes place when the beam on encountering the filter wheel hits a spoke 6 (in FIG. 1 at the start of the spoke).

During an interval from t0 to t5, covering five projection intervals 4, the lamp current has constant magnitude. This part of the lamp current can be referred to as a basic plateau 12 having a basic magnitude.

During an interval from t5 to t6, covering a final projection interval 4 during half a period of the lamp current, the lamp current has an increased magnitude. This part of the lamp current can be referred to as a positive pulse 14. Although the use of a positive pulse is beyond the invention it is observed that the magnitude of said positive pulse may me decreased dependent on aging of the lamp and an additional positive pulse of reduced with may be superimposed on the first positive pulse at the end thereof to maintain a constant high magnitude just before commutation. When using negative lamp current pulses to compensate for an increase of light during positive pulses a dedicated control must take the amplitudes and durations of both types of positive pulses into account when determining magnitudes and durations of the negative pulses. The invention is not concerned with that.

According to the prior art, as illustrated by FIG. 1, within at least one of the filter segments 4 of the color wheel there is arranged a sub segment having a small circumferential dimension and a reduced transmission factor. Such a segment is called auxiliary segment in here. Its interval is indicated by reference numeral 10. The auxiliary segment itself is referred to by numeral 10 as well.

Just like other filter segments 4, the auxiliary segment 10 is separated from adjacent filter segments by a spoke 6, leaving a segment 8 of reduced circumferential dimension of the segment 4 in which the auxiliary segment 10 is provided. Alternatively, a reduction of available effective circumferential dimension caused by the additional segment 10 may be distributed among all other segments 4.

The auxiliary segment 10 reduces the light intensity of the light beam passing through it. With control or modulation properties of the light valves receiving the filtered beam unchanged, the reduced light intensity allows to increase a resolution of the filtered light with respect to a control or modulation during the other filter segments 4 and 8. This is advantageous for enhancing a grey resolution. This method is known as DVE (Dark Video Enhancement).

A disadvantage of the DVE method is that the auxiliary segment 10 has a limited size to manufacture, so that under circumstances a larger one than necessary must be used for obtaining a wanted grey resolution. Further, the additional spoke 6 in front of it has an undetermined color and transmission factor. Therefore, just like the other spokes 6, the additional spoke 6 represents an undetermined transition between segment 8 and auxiliary segment 10 in front of it. The intensity of the filtered light beam, between t0 and t5 has a magnitude indicated as 13. In FIG. 1 the intensity is the same for the colors red, blue and green. This is merely by way of example. In other embodiments the intensity of the filtered beam can be different for different colors depending on the transmission factors of the different filter segments. The transitions on either side of the auxiliary segment 10 are indicated by dashed lines 16 (between times t1 and t2) and 18 (between times t3 and t4) as representing transitions of the light beam intensity with a flat portion 20 with reduced magnitude in between. Said transitions will introduce an undetermined contribution to a light integral, so that they counteract a wanted grey resolution with a suitable accuracy. For that reason this transition interval often is switched off by the display, which means the light during this interval is completely lost for projection. Another disadvantage of said prior art is the waste of energy because of the reduced transmission factor of the auxiliary segment 10.

According to the invention no physical auxiliary filter segment 10 is used. Instead, a negative pulse is superimposed on the basic lamp current 12. The negative pulse may partly coincide with a spoke 6 between adjacent (regular) filter segments 4. The negative pulse can have flanges which are very steep with respect to the transitions 16 and 18 of FIG. 1. This alleviates the prior art problem of energy waste, and it allows for fast and accurate control of the resolution enhancement by using the negative pulse. The negative pulse may have any width and any magnitude as circumstances require. As a result, a suitable and well-defined light integral can be obtained for a major part of the filter segment 4 in which the negative pulse occurs and a well-defined finer controlled light integral can be obtained during the negative pulse. As a whole a well-defined light integral with higher resolution can be obtained.

According to the invention the negative pulse may have different shapes and different locations with respect to a spoke 6. Below, several examples of combinations of shapes and locations of negative lamp current pulses for resolution enhancement will be discussed with reference to FIGS. 2 to 5.

Figure 2:
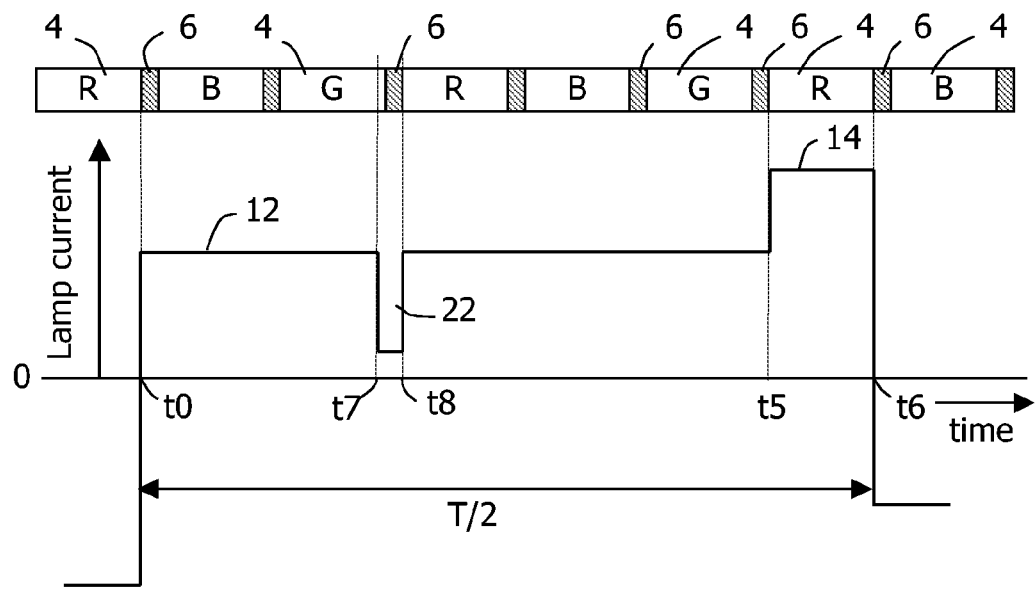
FIGS. 2 to 5 show diagrams like that of FIG. 1 but for different embodiments according to the invention.

With the example shown in FIG. 2 a negative lamp current pulse 22 has a longer duration than an interval of a spoke 6. The negative pulse 22 has straight flanges or edges. The leading flange is located at a time t7, which is a small interval in front of a spoke 6 of one projection interval 4 which is selected out of the six projection intervals occurring during half (T/2) a period of the lamp current. The trailing flange of the pulse 22 is located at a time t8 where said spoke 6 ends.

Preferably, to obtain the best result of resolution enhancement, the selected projection interval 4 corresponds to a filter segment 4 of the color green.

With the example of FIG. 2 the leading flange of the negative pulse can be made very steep by using electronic means. The advantages thereof are mentioned before. However, this may not be preferred because of the specifications of an electronic lamp driver required then and the costs involved therewith. To the contrary, the magnitude of the negative pulse 22 may raise during part of the spoke 6 with which it coincides, so that the trailing flange of the negative pulse 22 need not to be that steep and it requires no special measures to achieve it.

Taking dynamic behavior of the lamp into account, the magnitude of the lamp current during the negative pulse 22 may be reduced to 50 . . . 25% of the basic magnitude of plateau 12. This corresponds to a resolution enhancement of 1 to 2 bit.

Figure 3:
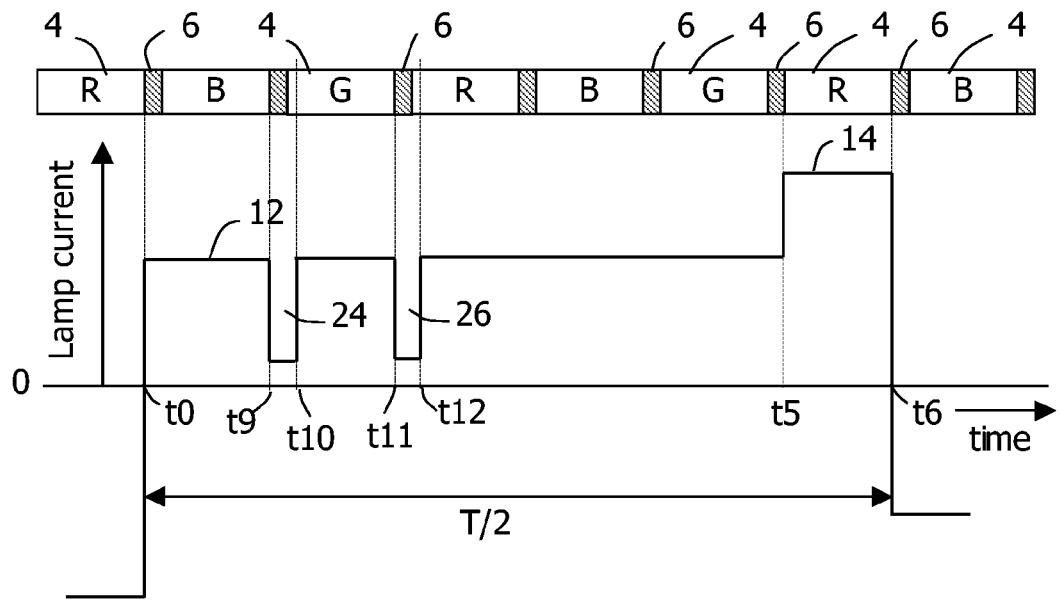

With the example shown in FIG. 3 advantage is taken from the fact that any raise in costs for manufacturing a lamp driver when using a negative pulse for resolution enhancement will not be increased when applying a negative pulse for a different color as well. The example of FIG. 3 shows, between times t9 and t10, a first negative pulse 24 for a filter segment 4 of the color green, and, between t11 and t12, a second negative pulse 26 for a filter segment 4 of the color red. Both negative pulses 24 and 26 start at the beginning of a spoke 6 and they end a small interval after the spoke in the green and red projection intervals 4 respectively. This allows a longer time for reducing the magnitude of the lamp current to a wanted magnitude and to stabilize on the wanted magnitude before the reduced lamp current and passed light has effect on the projection when leaving the spoke interval 6. A steep trailing flange of the negative pulses 24 and 26 may be obtained easier than a steep leading flange. As a result, for relatively low costs, a reduction of the lamp current magnitude to 25 . . . 12% can be obtained, which corresponds to a resolution enhancement of 2 to 3 bit.

Under circumstances, basically dependent on dynamic properties of the lamp, it may be advantageous to establish the leading flange of negative pulses for resolution enhancement by two or more steps, instead of a single step as shown in FIGS. 2 and 3. Besides, a negative pulse may be shaped to cover projecting intervals 4 of different colors on either side of a spoke interval 6. In this regard it must be observed that a projection resolution is less critical for some colors than others. For the example with three basic colors green (G), red (R) and blue (B), green is the most critical color, red is less critical and blue is not at all critical.

Figure 4:
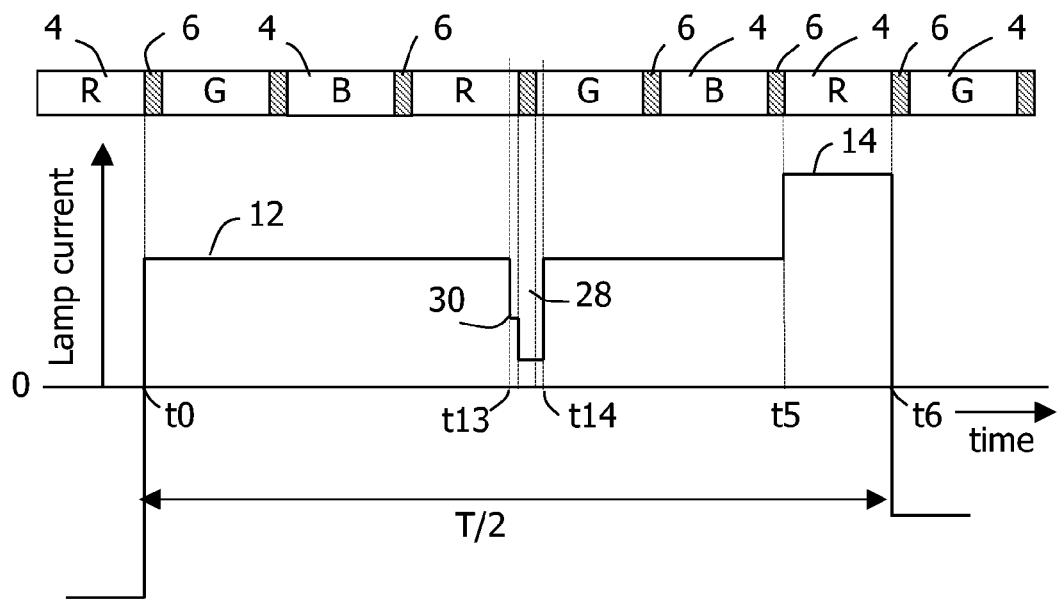

In the example shown in FIG. 4 the lamp current comprises such wider negative pulse 28 between times t13 and t14, which extends for a small part on either side of a spoke interval 6 between projection intervals 4 for red and green, respectively. The leading flange of the negative pulse 28 has a step 30, approximately halfway the full flange. The step 30 has a duration which allows the lamp current to settle at the magnitude of the step. In today's projector systems said step duration may be as short as 50 µs. Then, during the subsequent spoke interval 6, the magnitude of the lamp current may be further reduced. The whole of the spoke interval 6 is available to reach a reduced magnitude of, for example, 12.5% of the basic magnitude of plateau 12 and to settle on that reduced magnitude before light is passed through the next filter segment (the green one). As a result, for red a resolution enhancement of 1 bit is obtained and for green a resolution enhancement of 3 bit is obtained.

Using several steps per flange of a negative pulse is dependent on characteristics of the lamp and in particular on dynamics of the projector system.

Figure 5:
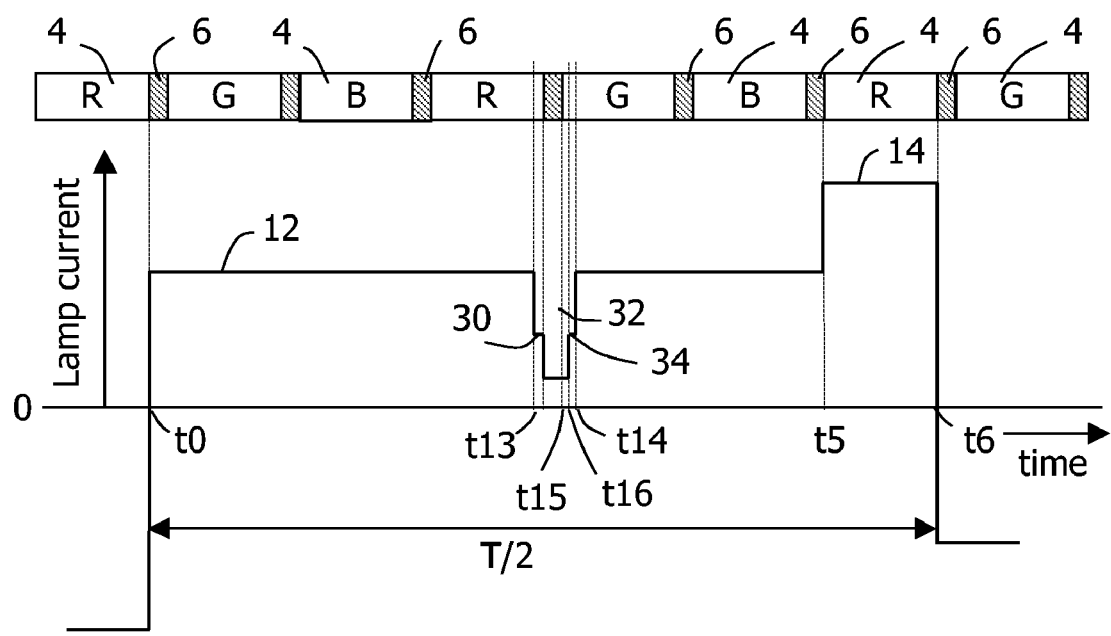

The lamp current of the example shown in FIG. 5 comprises a negative pulse 32, which is similar to the negative pulse 28 of FIG. 4, except that the trailing flange of negative pulse 32 has a step 34. The step 34 is located about halfway the full flange and it starts at a time t16 during the green projection interval 4, that is, some time after the ending of the spoke interval 6, which coincides with the negative pulse 32. Step 34 ends at a time t14. As a whole the trailing flange of pulse 32 is less steep than that of pulse 28. Therefore, the demands to be posed on the lamp driver may be smaller than for the example of FIG. 4 with pulse 28. Yet, a great resolution enhancement can be obtained with the example of FIG. 5: 1 bit for red, 3 bit for green between t15 and t16 and 2 bit for green between t16 and t14.

According to the description above, a light beam of alternating different basic colors is directed to a single light valve device. However, it must be observed that the principles of the invention can be applied also for each of several continuous beams of different basic colors, with each beam being directed to a corresponding light valve device, which is associated with that beam only. A multi-beam system is disclosed by U.S. Pat. No. 5,452,024.

The resolution enhancement which can be obtained by the invention provides an important improvement of the image quality of the projector system in a simple an cheap way.

The invention claimed is:

1. A method for driving a high-pressure gas discharge lamp of a projector system, which is suitable to produce a light beam of a basic color, which is selected from several basic colors, during a projection interval and to supply said light beam to a light valve device, wherein the lamp is driven by a lamp current, and during said projection interval light valves of the light valve device are controlled to have each valve provide a respective wanted light integral over said projection interval, characterized in that during at least one of a sequence of successive projection intervals the amplitude of the lamp current is temporarily reduced for at least a time lapse during which all light valves can be controlled for said one basic color, wherein the beam is made to contain different basic colors during successive projection intervals, and a duration of the reduced lamp current amplitude partly coincides with a duration of a transition interval between successive projection intervals, wherein the duration of the reduced current amplitude is greater than the duration of the transition interval between successive projection intervals, and wherein the amplitude of the lamp current is reduced during a first projection interval before reaching a transition interval and the amplitude of the lamp current is restored after said transition interval has ended during a second projection interval directly following the transition interval.

2. A system comprising
a lamp producing light in response to a lamp current;
a ballast circuit coupled to the lamp for supplying the lamp current to the lamp;
a rotating color wheel for generating during a projection interval a color light beam of a basic color from light generated by the lamp, the rotating color wheel having a plurality of color filter segments, wherein each adjacent pair of the color filter segments is separated by a spoke having a reduced light transmission with respect to the color filter segments; and
a light valve device comprising light valves for receiving the color light beam and a light valve controller coupled to the light valves for controlling each light valve to have each valve provide a respective wanted light integral over said projection interval,
wherein adjacent projection intervals are separated by transition intervals each corresponding to a time when the light from the lamp passes through one of the spokes and is attenuated with respect to the color light, and
wherein during a portion of one projection interval of the sequence of successive projection intervals and during at least a portion of an adjacent transition interval when the light from the lamp passes through one of the spokes, a magnitude of the lamp current provided from the ballast to the lamp is temporarily reduced from a basic lamp current value to a reduced lamp current value for at least a time period during which all light valves can be controlled for said one basic color, wherein the portion of the one projection interval is less than the entire projection interval, wherein the reduction of the lamp current magnitude from the basic lamp current value to the reduced lamp current value is carried out in a stepwise fashion having at least two immediately adjacent magnitude steps.

3. A method, comprising:
providing a rotating color wheel having a plurality of color filter segments, wherein each adjacent pair of the color filter segments is separated by a spoke having a reduced light transmission with respect to the color filter segments,
providing light from a lamp to the rotating color wheel to produce a color light beam of a basic color, which is selected from several basic colors, during each of a sequence of successive projection intervals and to supply said color light beam to a light valve device having a plurality of light valves, wherein the lamp is driven by a lamp current, and during said projection interval the light valves of the light valve device are controlled to have each light valve provide a respective desired light integral over said projection interval,
wherein adjacent projection intervals are separated by transition intervals each corresponding to a time when the light from the lamp passes through one of the spokes and is attenuated with respect to the color light, and
wherein during a portion of one projection interval of the sequence of successive projection intervals and during at least a portion of an adjacent transition interval when the light from the lamp passes through one of the spokes, a magnitude of the lamp current is temporarily reduced from a basic lamp current value to a reduced lamp current value for at least a time period during which all light valves can be controlled for said one basic color, wherein the portion of the one projection interval is less than the entire projection interval, wherein the reduction of the lamp current magnitude from the basic lamp current value to the reduced lamp current value is carried out in a stepwise fashion having at least two immediately adjacent magnitude steps.

4. The method of claim 3, wherein the color light beam is made to contain different basic colors during successive projection intervals.

5. The method of claim 3, wherein the duration of the reduced current magnitude is greater than the duration of the adjacent transition interval between successive projection intervals.

6. The method of claim 3, wherein the amplitude of the lamp current is reduced during the at least one projection interval and the magnitude of the lamp current is restored during the adjacent transition interval that directly follows the at least one projection interval.

7. The method of claim 3, wherein the magnitude of the lamp current is reduced at the beginning of the adjacent transition interval.

8. The method of claim 3, wherein the magnitude steps have, during projection intervals, durations, which each allow a control of the light valves.

9. The method of claim 3, wherein a restoring of the magnitude of the lamp current to the basic lamp current value is carried out in a stepwise fashion having at least two immediately adjacent magnitude steps.

10. The method of claim 9, wherein the subsequent steps have, during projection intervals, durations, which each allow a control of the light valves.

11. The method of claim 3, wherein the magnitude of the lamp current is temporarily reduced for the basic color green.

12. The method of claim 3, wherein the magnitude of the lamp current is temporarily reduced for each of several basic colors.

13. The method of claim 3, wherein the magnitude of the lamp current is temporarily reduced for green and red.

14. The method of claim 3, wherein the magnitude of the lamp current has the basic lamp current value during the one projection interval except for the portion wherein the magnitude of the lamp current is temporarily reduced to the reduced lamp current value.

15. The method of claim 14, wherein the reduced lamp current value is from 25% to 50% of the basic lamp current value.

16. The method of claim 3, wherein the lamp current has a magnitude that is about 50% of the basic lamp current value during a first one of the at least two magnitude steps, and has a magnitude that is about 12.5% of the basic lamp current value during a second one of the at least two magnitude steps.

* * * * *